United States Patent
Lafont et al.

(10) Patent No.: US 7,963,480 B2
(45) Date of Patent: Jun. 21, 2011

(54) STRUT FOR LOCKING THE ENGINE OF AN AIRCRAFT

(75) Inventors: Laurent Lafont, Pechbusque (FR); Frederic Journade, Toulouse (FR); Eric Renaud, Brignemont (FR)

(73) Assignee: Airbus France, Toulouse (FR)

( * ) Notice: Subject to any disclaimer, the term of this patent is extended or adjusted under 35 U.S.C. 154(b) by 564 days.

(21) Appl. No.: 12/067,192

(22) PCT Filed: Sep. 22, 2006

(86) PCT No.: PCT/EP2006/066637
§ 371 (c)(1),
(2), (4) Date: Mar. 8, 2008

(87) PCT Pub. No.: WO2007/033995
PCT Pub. Date: Mar. 29, 2007

(65) Prior Publication Data
US 2008/0272229 A1      Nov. 6, 2008

(30) Foreign Application Priority Data
Sep. 26, 2005   (FR) ..................... 05 52866

(51) Int. Cl.
*B64D 27/12* (2006.01)
(52) U.S. Cl. ........................................................ 244/54
(58) Field of Classification Search .................. 244/54; 60/39.31, 39.091; 248/554–557; 403/316; 411/508; 29/281.5
See application file for complete search history.

(56) References Cited

U.S. PATENT DOCUMENTS

| 3,831,888 | A | * | 8/1974 | Baker et al. ..................... 244/54 |
| 5,186,591 | A | * | 2/1993 | Malks ........................... 411/508 |
| 5,303,880 | A | * | 4/1994 | Cencula et al. ................. 244/54 |
| 7,438,262 | B2 | * | 10/2008 | Chamberlain .................. 244/54 |
| 2006/0280551 | A1 | * | 12/2006 | Pineiros et al. ............... 403/316 |
| 2007/0069068 | A1 |  | 3/2007 | Lafont et al. |
| 2007/0069069 | A1 |  | 3/2007 | Diochon et al. |

FOREIGN PATENT DOCUMENTS

| EP | 0 147 878 | 7/1985 |
| EP | 0 844 172 | 5/1998 |
| EP | 0 844 174 | 5/1998 |
| EP | 1 053 937 | 11/2000 |
| EP | 1 574 429 | 9/2005 |

OTHER PUBLICATIONS

U.S. Appl. No. 11/525,018, filed Sep. 22, 2006, Lafont.
U.S. Appl. No. 11/916,537, filed Dec. 5, 2007, Combes et al.
U.S. Appl. No. 11/914,560, filed Nov. 16, 2007, Combes et al.
U.S. Appl. No. 12/064,916, filed Feb. 26, 2008, Combes et al.
U.S. Appl. No. 12/065,837, filed Mar. 5, 2008, Combes et al.
U.S. Appl. No. 12/066,916, filed Mar. 14, 2008, Lafont.
U.S. Appl. No. 12/918,500, filed Aug. 20, 2010, Journade et al.
U.S. Appl. No. 12/918,334, filed Aug. 19, 2010, Journade et al.
U.S. Appl. No. 12/918,530, filed Aug. 20, 2010, Journade et al.

* cited by examiner

*Primary Examiner* — Galen Barefoot
(74) *Attorney, Agent, or Firm* — Oblon, Spivak, McClelland, Maier & Neustadt, L.L.P.

(57) ABSTRACT

An engine mount for an aircraft engine. The engine mount includes a rigid structure forming a box closed at its forward end by a forward closure rib, and a mounting system including a forward engine attachment having an attachment body fixedly mounted on the rigid structure. The attachment body lies against a forward surface, and the engine mount includes at least one shear pin passing at least in part through the attachment body and forward closure rib.

17 Claims, 7 Drawing Sheets

STRUT FOR LOCKING THE ENGINE OF AN AIRCRAFT

TECHNICAL AREA

The present invention generally relates to an aircraft engine assembly, of the type comprising an engine and a pylon to secure the engine, equipped in particular with an engine mounting system which comprises a plurality of engine attachments and is positioned between a rigid structure of the pylon and the engine.

The invention also relates to said pylon for an aircraft engine.

The invention can be used on any type of aircraft equipped with turbojet engines for example or turboprop engines.

This securing pylon, also called <<EMS>> (Engine Mounting Structure), permits the suspending of a turbojet engine below the wing of an aircraft for example, or the mounting of this turbojet engine above this same wing.

STATE OF THE PRIOR ART

Said engine mount is intended to form a connecting interface between an engine such as a turbojet engine and an aircraft wing. It permits the loads generated by its associated turbojet engine to be transferred to the airframe, and also provides a path for fuel, electrical and hydraulic systems, and air between the engine and the aircraft.

To ensure the transmission of loads, the engine mount comprises a rigid structure, often of <<box>> type, i.e. formed by the assembly of upper and lower spars and two side panels joined together via ribs, this box being closed forward and aft by a forward closure rib and aft closure rib respectively.

Also the mount is equipped with an engine mounting system positioned between the turbojet engine and the rigid structure of the engine mount, this system globally comprising at least two engine attachments, generally one forward attachment and one aft attachment.

Additionally, the mounting system comprises a thrust mount device transferring thrust loads generated by the turbojet engine. In the prior art, this device is in the form of two side links for example, connected firstly to an aft portion of the fan case of the turbojet engine, and secondly to the aft engine attachment fixed onto the engine case.

Similarly, the engine mount also comprises a second mounting system positioned between the rigid structure of this engine mount and the aircraft wing, this second system usually consisting of two or three attachments.

Finally, the engine mount is provided with a secondary structure to separate and support the different systems whilst carrying aerodynamic cowling.

In some prior art embodiments, the engine mounting system comprises a forward attachment, called a fan attachment since it is intended to be attached fixedly to the engine fan case, which comprises an attachment body having a horizontal contact surface lying against a horizontal contact surface of the rigid structure, these contact surfaces also being called securing surfaces. The horizontal securing interface formed by these two surfaces therefore extends along a plane defined by the longitudinal and transverse directions of the engine mount, and is generally located at an outer surface of the lower spar of the box if the engine is to be suspended under the wing of the aircraft. The attachment body for the forward engine attachment is generally fixed to the lower spar of the box, being arranged below it.

This arrangement has a non-negligible disadvantage i.e. the entirety of the attachment body projects downwardly from the box, causing the rigid structure to be positioned well above the engine fan case, thereby leading to an engine mount of great height, which is substantially penalising with regard to aerodynamic drag, and evidently translates as a loss in the performance level of the aircraft. In this respect, it is noted that such loss is of relative consequence owing to the large dimensions of the attachment body, imposed by the need to ensure the transmitting of engine-derived loads in the direction of the rigid structure of the engine mount.

DESCRIPTION OF THE INVENTION

The purpose of the invention is therefore to propose an aircraft engine mount which overcomes the above-mentioned drawback connected with prior art embodiments, and also to present an engine assembly provided with said mount.

A further purpose of the invention is to propose a method to mount an engine onto the rigid structure of this engine mount.

For this purpose, the subject-matter of the invention is an aircraft engine mount comprising a rigid structure forming a box closed at its forward end by a forward closure rib, and an engine mounting system assembled fixedly on the rigid structure and notably comprising a forward engine attachment provided with an attachment body mounted fixedly on the rigid structure. According to the invention, the attachment body of the forward engine attachment lies against a forward surface of the forward closure rib of the box. In addition, the forward engine attachment comprises at least one shear pin passing at least in part through the attachment body and through the forward closure rib.

Advantageously, it arises from the definition of the invention given above that the engine mount has been modified compared with those found in the prior art, so that the attachment body of the forward engine attachment no longer lies below the lower spar and forward closure rib of the box, but ahead of the closure rib. Therefore if the engine mount is intended to ensure the suspending of the engine under the aircraft wing, the proposed arrangement roughly allows the attachment body to be positioned at least partly above the lower spar of the box, whereas in the prior art this same body extended downwardly only on and after this same lower spar.

Therefore said configuration clearly generates more space below the lower spar of the box, and hence generates a decrease in aerodynamic disturbance over the forward engine attachment. For an attachment body of same size, the generated drag is therefore advantageously lower than previously encountered.

Additionally, again in the preferred case when the engine mount is to be used to suspend an engine below the aircraft wing, the fact that the attachment body of the forward attachment is raised, means that that the ground clearance under the associated engine can be increased.

Evidently, by making provision for the attachment body to lie against the forward surface of the forward closure rib i.e. against its outer surface usually oriented vertically, this does not necessarily entail making provision for direct contact between these two elements.

Nonetheless, it is preferably provided that the attachment body comprises an aft contact surface in contact with a forward contact surface of the rigid structure which belongs to the forward surface of the forward closure rib, the attachment body and the rib then lying flat against each other and in contact via their respective contact surfaces.

Also, according to the invention, the forward engine attachment comprises at least one shear pin passing at least in part through the attachment body and the forward closure rib. In other words, each of the two elements formed by the attachment body and forward closure rib is crossed at least in part by each shear pin.

In addition, the forward engine attachment preferably comprises a plurality of tension bolts ensuring the fixing of the attachment body onto the forward closure rib, these bolts making it possible in particular to limit the size of the shear pin(s) used.

Preferably, each shear pin is oriented substantially along a longitudinal direction of the engine mount, this positioning being fully suitable to ensure the transmission of loads exerted in the transverse and vertical directions of the engine mount. As a preferred example, provision is therefore made for the shear pins to be two in number, spaced apart along the transverse direction of the engine mount.

In general, it is preferably ensured that the pins are arranged orthogonal to the forward closure rib, this rib being preferably arranged vertically, namely in a plane defined by the transverse and vertical directions of the engine mount.

Nevertheless, the invention also covers the cases in which the forward closure rib lies at angle relative to the vertical, whilst remaining parallel to the transverse direction.

Preferably, the forward engine attachment is designed to ensure the transfer of loads exerted in the transverse direction and vertical direction of the engine mount, and is also designed to ensure transfer of the moment exerted in the longitudinal direction of this engine mount.

Also, the engine mounting system which is preferably an isostatic system comprises a thrust mount device and an aft engine attachment designed to ensure the transfer of loads exerted in the transverse and vertical directions of the engine mount.

A further subject-matter of the invention is an aircraft engine assembly comprising an engine mount such as just described, and an engine secured to this engine mount.

A final subject-matter of the invention is a method to mount an aircraft engine onto the rigid structure of an engine mount such as just described. It comprises a securing step on the forward closure rib of the rigid structure to secure the attachment body of the forward engine attachment which is previously mounted on an engine case, this attachment body being intended to be secured onto the forward closure rib via at least one shear pin passing through a first primary orifice and a second primary orifice respectively made in the attachment body and in the forward closure rib, this securing step of the attachment body to the forward closure rib comprising the following successive steps:

pre-positioning of the engine relative to the engine mount for the purpose of placing the first primary orifice opposite the second primary orifice; and inserting a pin equipped with a convex centering head through the two opposite facing primary surfaces, so that this pin equipped with a convex centering head and housed in the two primary orifices forms the shear pin.

Therefore, as already mentioned above, the proposed invention notably has the particular aspect that it uses a rigid structure having a contact surface oriented forwardly, unlike prior art embodiments in which the contact surface provided on the rigid structure and intended to receive the attachment body of the forward attachment is oriented horizontally below this same rigid structure.

As a result, owing to the special arrangement of this contact surface belonging to the forward closure rib of the box, which can therefore be oriented substantially vertically for example, i.e. in a plane defined by the transverse and vertical directions of the engine mount, or slightly at an angle relative to the vertical while preferably remaining parallel to the transverse direction, there is advantageously obtained an improvement in accessibility for maneuvering the securing members intended to ensure assembly of the attachment body onto the rigid structure. It is effectively provided that this body is advantageously fixed to a forward surface of the forward closure rib of the box-shaped rigid structure. Since the entire rigid structure is positioned towards the aft relative to the securing interface, the operator therefore has the benefit of a free space forward of this interface which largely facilitates handling of the different parts used to achieve securing of the attachment body.

The pre-positioning operation of the engine is conducted so that the two primary orifices are pre-centred i.e. they are roughly aligned before starting the operation to insert the pin, in these same primary orifices, that is subsequently intended to form the shear pin ensuring the transfer of engine loads towards the engine mount.

Next this pin inserting operation can proceed, to insert the pin in the primary orifices, this pin being provided with a convex centering head whose function, during insertion of the pin, is gradually to correct the rough alignment between the two primary orifices so as to arrive at perfect alignment of these two orifices.

Evidently, it is noted that the pre-positioning of the engine relative to the rigid structure is made with sufficient accuracy so that the pin with convex head is able successively to enter the first then the second primary orifice, or conversely, by generating progressive correction of alignment translating as a relative movement between the engine and the rigid structure, despite the substantial vertical load associated with the engine.

Finally it is indicated that once the pin insertion operation is completed, this pin is intended to remain permanently in the two primary orifices, to form the shear pin between the attachment body and the rigid structure. Therefore, one of the particular aspects of this invention lies in the fact that the convex centering head, which is preferably olive-shaped, is first used during the mounting operation to ensure gradual alignment of the primary orifices until perfect alignment is achieved, and is then used to form part of the shear pin transferring loads towards the rigid structure when the engine is in operation.

Preferably, when several shear pins are provided between the attachment body and the rigid structure, the insertion operation of a pin equipped with a convex centering head is repeated as many times as there are number of shear pins. In said case, it is preferably provided that the initial engine pre-positioning operation is conducted so as to place all the first primary orifices opposite their respectively associated second primary orifices.

Preferably this pre-positioning operation consists of:

bringing the engine close to the engine mount so that it is possible to insert a first support pin through a first secondary orifice and a second secondary orifice made in the attachment body and the forward closure rib respectively, and so that it is possible to insert a second support pin through a first secondary orifice and a second secondary orifice also made in the attachment body and forward closure rib respectively, each of the two support pins having a smaller diameter than the diameter of the associated first and second secondary orifices; then lowering the engine until a bearing is obtained between an upper part of each of the two first secondary orifices of the attachment body, against its associated support pin.

Therefore the positioning of these support pins, also called indexing supports, ensures the holding of the engine slightly below its final position with respect to the engine mount, this position being fully appropriate for subsequent insertion of the centering pin with convex head in the primary orifices.

Preferably, after each centering pin with convex head has been placed in position, these support pins are removed from the secondary orifices, using a suitable extractor. It is noted that in the preferred, advantageous case in which the above-mentioned secondary orifices are subsequently intended to receive so-called <<failsafe>> shear pins, this removal of the support pins is followed by the insertion of two failsafe shear pins through these same secondary orifices.

Other advantages and characteristics of the invention will become apparent in the non-limiting description given below.

BRIEF DESCRIPTION OF THE DRAWINGS

This description is made with reference to the appended drawings in which.

DETAILED DESCRIPTION OF PREFERRED EMBODIMENTS

Figure 1:
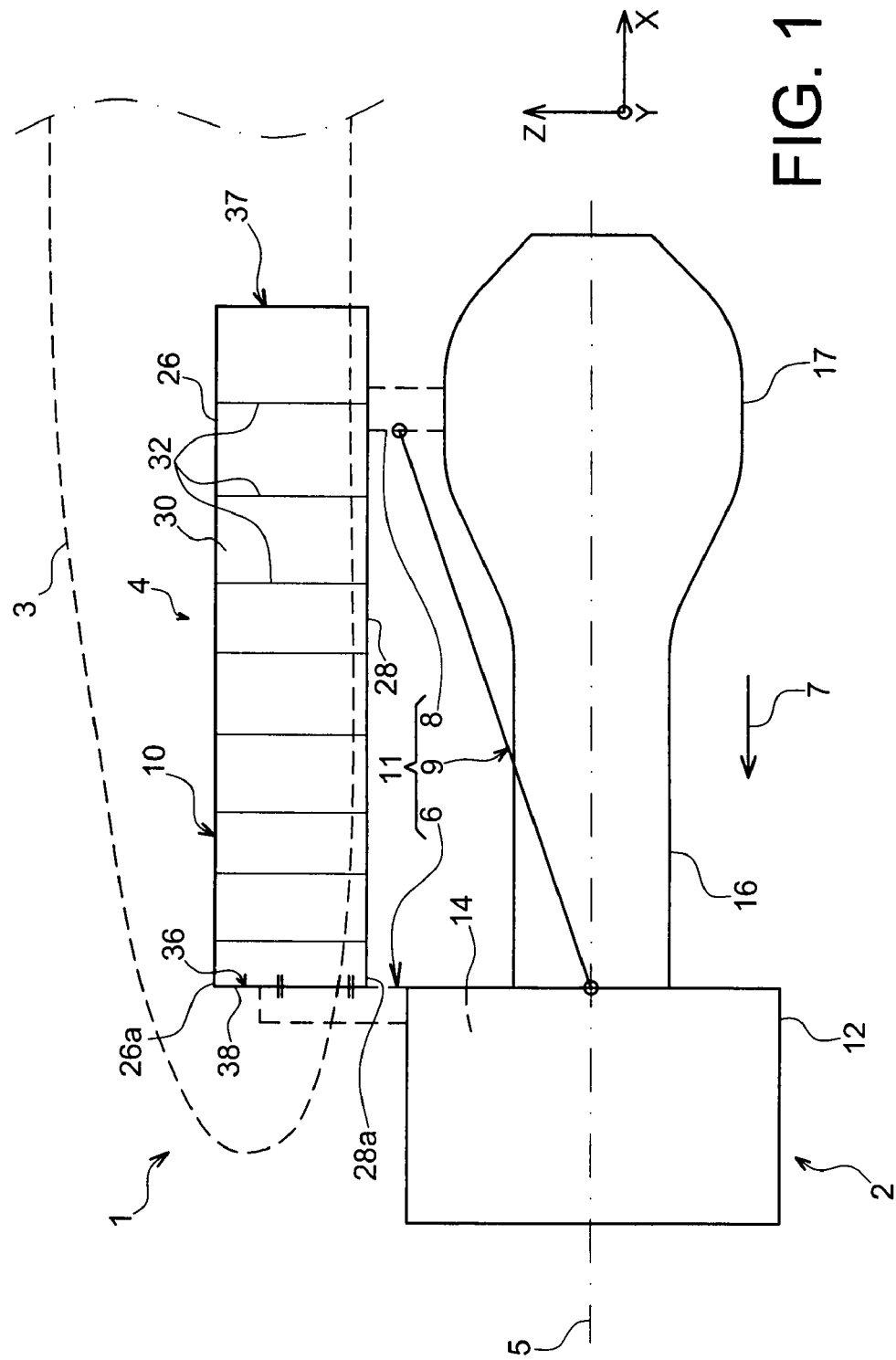
FIG. 1 is a partial schematic side view of an aircraft engine assembly comprising an engine mount according to a preferred embodiment of the present invention.

With reference to FIG. 1, an aircraft engine assembly 1 can be seen, intended to be suspended below a wing 3 of this aircraft, this assembly 1 subject of the present invention being provided with an engine mount 4 in the form of a preferred embodiment of the present invention.

Globally, the engine assembly 1 comprises an engine such as a turbojet engine 2 and the engine mount 4, the mount being provided in particular with a rigid structure 10 and an engine mounting system 11 consisting of a plurality of engine attachments 6, 8 and a thrust mount 9 transferring thrust loads generated by the turbojet engine 2, the mounting system 11 therefore being positioned between the engine and the above-mentioned rigid structure 10. By way of indication, it is noted that the assembly 1 is intended to be surrounded by a nacelle (not shown in this figure), and the engine mount 4 comprises another series of attachments (not shown) to ensure the suspending of this assembly 1 below the aircraft wing.

In the remainder of this description, by convention X is used to designate the longitudinal direction of the engine mount 4, which can be likened to the centerline direction of the turbojet engine, this direction X lying parallel to a longitudinal axis 5 of this turbojet engine 2. Also, Y is used to designate the direction oriented transversally to the engine mount 4 and which is also comparable with the transverse direction of the turbojet engine 2, and Z designates the vertical direction or height, these three directions X, Y and Z lying orthogonal to each other.

Also, the terms <<forward>> and <<aft>> are to be considered with respect to a direction of travel of the aircraft subsequent to the thrust exerted by the turbojet engine 2, this direction being schematically illustrated by arrow 7.

In FIG. 1, it can be seen that only the thrust mount device 9, engine attachments 6,8 and the rigid structure 10 of the engine mount 4 are shown. The other constituent parts of this engine mount 4, such as the means to secure the rigid structure 10 below the aircraft wing or the secondary structure separating and supporting the different systems and carrying aerodynamic cowling, are conventional parts identical or similar to those found in the prior art and known to those skilled in the art. Therefore no detailed description will be given thereof.

The turbojet engine 2 is provided forwardly with a fan case 12 of large size delimiting an annular fan duct 14, and towards the aft comprises a central case 16 of smaller size enclosing the core of this turbojet engine. Finally, the central case 16 is extended towards the aft by an exhaust case 17 of larger size than case 16. Cases 12, 16 et 17 are evidently secured to one another.

As can be seen FIG. 1, the plurality of engine attachments consists of a forward engine attachment 6 and an aft engine attachment 8. The thrust mount device 9 is in the form of two side links for example (only being visible since it is a side view), connected firstly to an aft portion of the fan case 12, and secondly to an evener bar which itself is mounted on the aft attachment 8.

The forward engine attachment 6, whose positioning specific to the present invention is described below, is secured to the fan case 12 and is designed so that it can transfer the loads generated by the turbojet engine 2 in directions Y and Z. By way of indication, this forward attachment 6 preferably enters into an end portion of the circumference of the fan case 12.

The aft engine attachment 8 is globally positioned between the exhaust case 17 and the rigid structure 10 of the engine mount. It is of conventional design so that it can transfer the loads generated by the turbojet engine 2 in directions Y and Z, but not the loads exerted along direction X.

Figure 2:
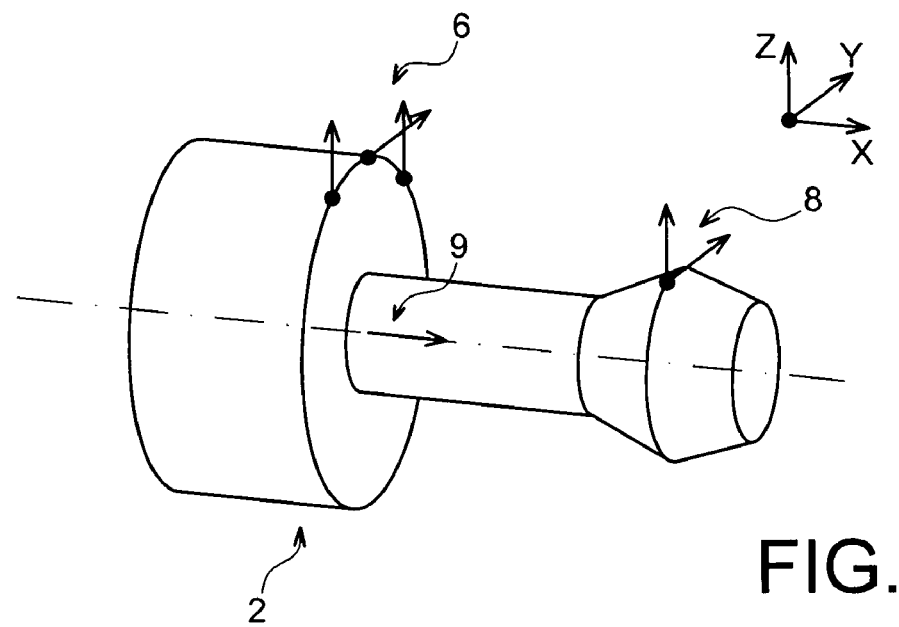
FIG. 2 is a perspective view schematizing load transfer by the engine mounting system fitted to the engine mount shown FIG. 1.

In this manner, with the mounting system 11 of isostatic type, as schematically illustrated FIG. 2, the transferring of loads exerted in direction X is made via the thrust mount device 9, the transfer of loads exerted in direction Y is achieved via the forward attachment 6 and aft attachment 8, and the transfer of loads exerted in direction Z is also achieved jointly by attachments 6 and 8. Additionally, the transfer of the moment exerted along direction X is made vertically via the forward attachment 6, the transfer of the moment exerted along direction Y is obtained via the forward attachment 6 jointly with attachment 8, and the transfer of the moment exerted along direction Z is obtained transversally also via attachment 6 and attachment 8.

Still with reference to FIG. 1, it can be seen that structure 10 is in the form of a box extending in direction X, this box also being called a torque box. It is conventionally formed of an upper spar 26 and a lower spar 28, and of two side panels 30 (only being visible in FIG. 1) both extending in direction X and substantially along a plane XZ. Inside this box, transverse ribs 32 arranged along planes YZ and spaced longitudinally reinforce the rigidity of the box. It is noted by way of indication that elements 26, 28 and 30 can each be made in a single piece, or by the assembly of joining sections, which may optionally lie slightly at an angle to each other. In addition, among the above-cited transverse ribs, there is a forward closure rib 36 of the box and an aft closure rib 37 of the box, these ribs positioned at the ends of the box therefore being globally arranged along planes YZ.

Again with reference to FIG. 1 illustrating a case in which the engine 2 is intended to be suspended below the wing 3, provision is made for the forward closure rib 36 of structure 10 to act as front bearing for an attachment body of the forward engine attachment 6. More precisely, the rib 36 has a forward surface 38 or outer surface globally arranged along plane YZ but possibly being of complex geometry in particular for the purpose of defining protuberances against which this same attachment body is intended to lie.

Preferably, it is provided that a portion of this forward surface 38 defines a forward contact surface (not referenced) or forward fixing surface intended to lie against and in contact with an aft contact surface (not shown) or an aft fixing surface belonging to the attachment body of the forward attachment 6.

Therefore, with this special arrangement of the attachment body, it is possible to obtain partial overlap of the forward closure rib 36 and this same attachment body of the forward attachment 6, in direction Z, which globally allows compacting of the structure 10 with the forward engine attachment assembly, and hence reducing of the projection formed by the engine mount above the engine nacelle, over this attachment 6, thereby reducing aerodynamic drag.

Figure 3:
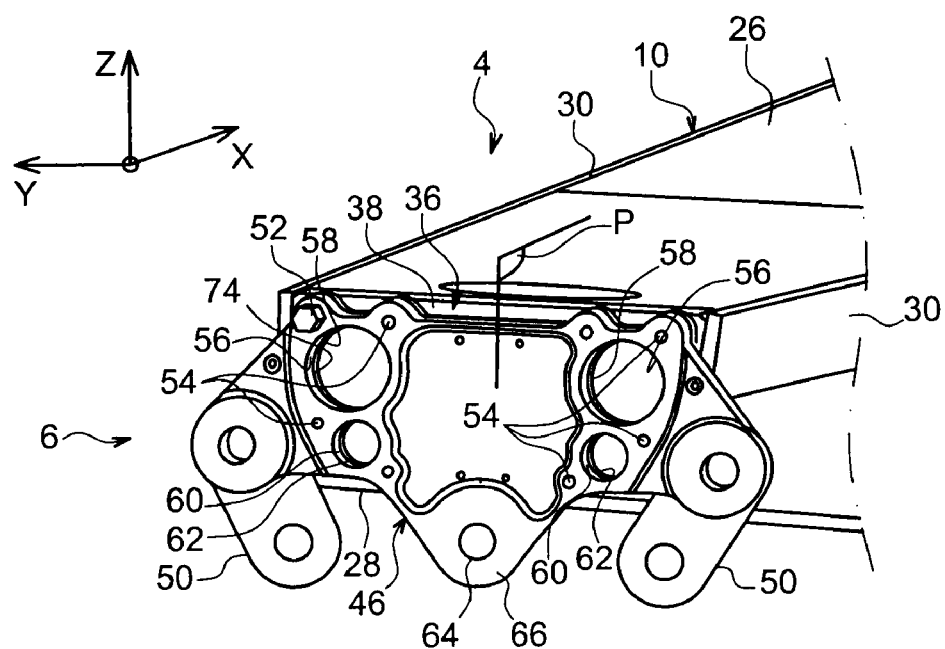
FIG. 3 is a detailed perspective view of the forward part of the engine mount shown FIG. 1.

With reference now to FIG. 3 giving a more detailed view of the forward part of the engine mount 4, in which a vertical median plane P parallel to direction X forms a plane of symmetry for this same engine mount, it can be seen that the forward engine attachment 6 therefore comprises an attachment body 46 in the form of a bracket oriented transversally along a plane YZ, being secured to rigid structure 10 and lying against the forward surface 38 of the closure rib 36.

To ensure this assembly, the attachment 6 may comprise tension bolts 52 (only one being shown), these tension bolts being oriented along direction X and passing through orifices 54 made through the body 46 and the rib 36.

Also, attachment 6 additionally comprises two shear pins (not shown FIG. 3) also called active shear pins and arranged symmetrically relative to plane P, these pins also preferably being oriented along direction X. Each shear pin is intended to pass through a first primary orifice 56 made in the body 46 and a second primary orifice 58 made in the rib 36, being aligned with orifice 56 in direction X.

At two side ends of the attachment body 46, the forward engine attachment 6 has two devises on which two shackles/links 50 are pivoted, each thereof partly forming a semi-attachment for the forward attachment through which loads can transit exerted along direction Z. As is known to those skilled in the art, these shackles 50 are also pivoted at their other end on clevises also belonging to the forward attachment 6 and which are secured fixedly onto the engine case 2.

With the above-described design, it can be understood that this forward attachment is fully adapted to ensure the transmission of loads exerted along directions Y and Z, and also to ensure transfer of the moment exerted along direction X.

In this respect, it is preferably provided that each of the above-mentioned two groups of primary orifices 56, 58 is associated with a group of secondary orifices 60, 62 respectively provided in the body 46 and rib 36, each group of secondary orifices being designed to house a failsafe shear pin (not shown). The mounting of each failsafe shear pin in the first secondary orifice 60 and the second secondary orifice 62 leaves a radial clearance so that no load transits therethrough under normal conditions, and so that this pin is able to provide a new load path in the event of rupture of the main shear pin with which it is associated.

It is noted that one alternative embodiment may, in known manner, consist of providing that the two shear pins are designed to integrate the failsafe function, which would eliminate the need to provide for secondary pins and secondary orifices 60, 62.

Again by way of indication, it is noted that this failsafe function is also ensured by the junction between the attachment body 46 and the engine case, via a failsafe pin mounted with clearance at a lower central part 66 of the body 46.

Figure 4:
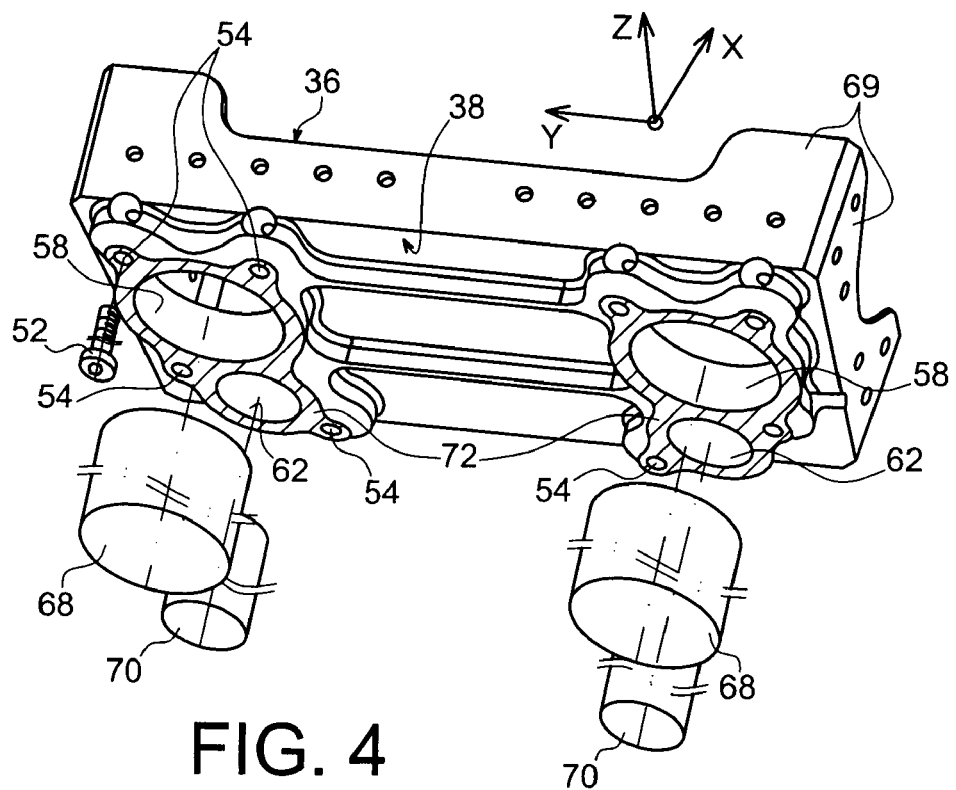
FIG. 4 is a perspective view of the forward closure rib of the box belonging to the engine mount shown FIG. 3.

With reference now to FIG. 4 showing the forward closure rib 36 of the box, it can be seen that the forward surface 38 of this rib has a surface globally oriented along a plane YZ, but in fact preferably has protuberances projecting forwardly. Also, the rib 36 has four fins 69 intended to be used for its securing to the spars 26, 28 and two side panels 30.

The above-mentioned protuberances are preferably located at portions of the rib 36 which delimit orifices 54, 58, 62 to house the bolts 52, shear pins 68 and failsafe pins 70. Also, it is at the most forward part of these protuberances that the forward surface 38 delimits the forward contact surface 72 intended to lie against and in contact with the aft contact surface of the attachment body 46. This contact surface 72 or securing surface, cross-hatched in FIG. 4, is preferably substantially oriented along plane YZ, and hence is globally located at the contours of the above-mentioned orifices 54, 58, 62.

Evidently it is to be appreciated that the aft contact surface or securing surface of the body 46, referenced <<74>> in FIG. 3, preferably has a shape which mates with the shape of surface 72, and is therefore preferably substantially oriented along the same plane YZ as the latter.

With reference now to FIGS. 5a to 5h, a method is described to mount an engine 2 on the engine mount 4 according to one preferred embodiment of the present invention, and more specifically a securing step to secure the attachment body 46 of the forward attachment 6 on the forward closure rib 36 of box 10.

Figure 5A:
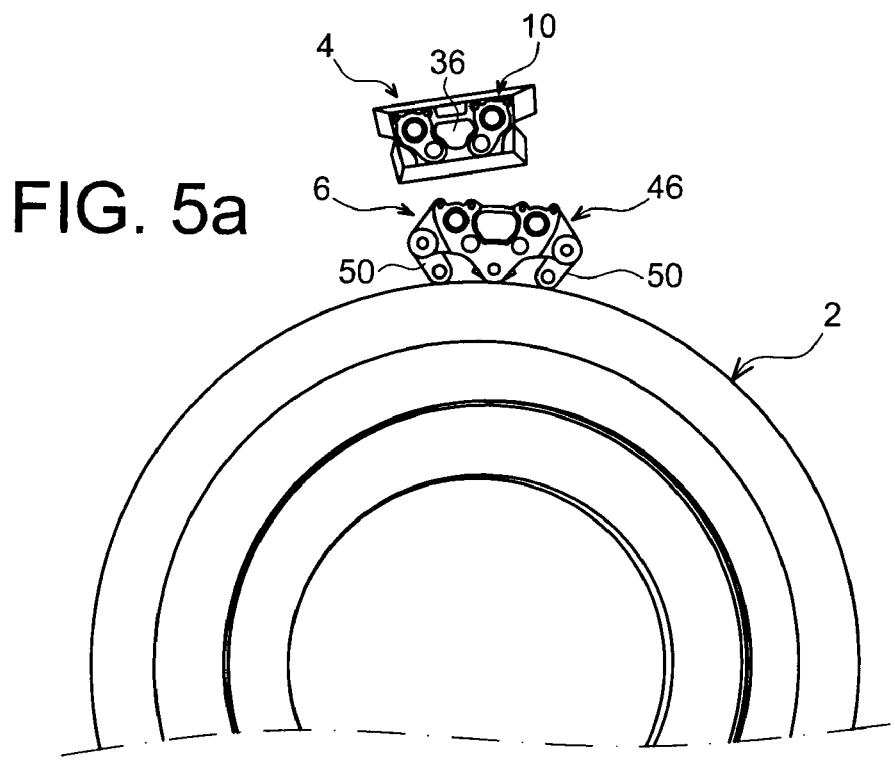
FIGS. 5a to 5h are views schematizing different operations of a securing step implemented under a mounting method according to one preferred embodiment of the present invention, this step consisting of securing the attachment body of the forward engine attachment onto the rigid structure of the engine mount.
Figure 5B:
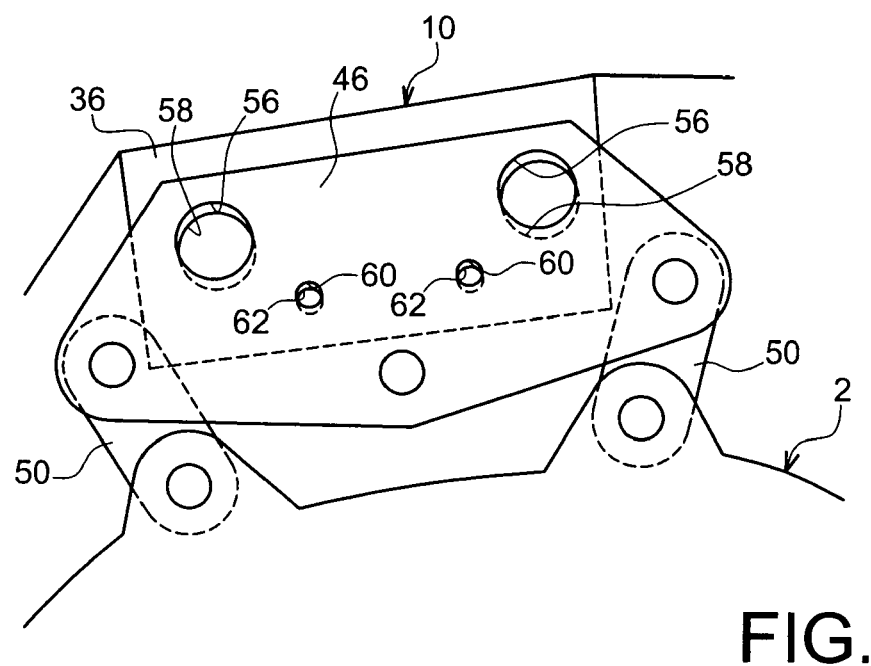
Figure 5C:
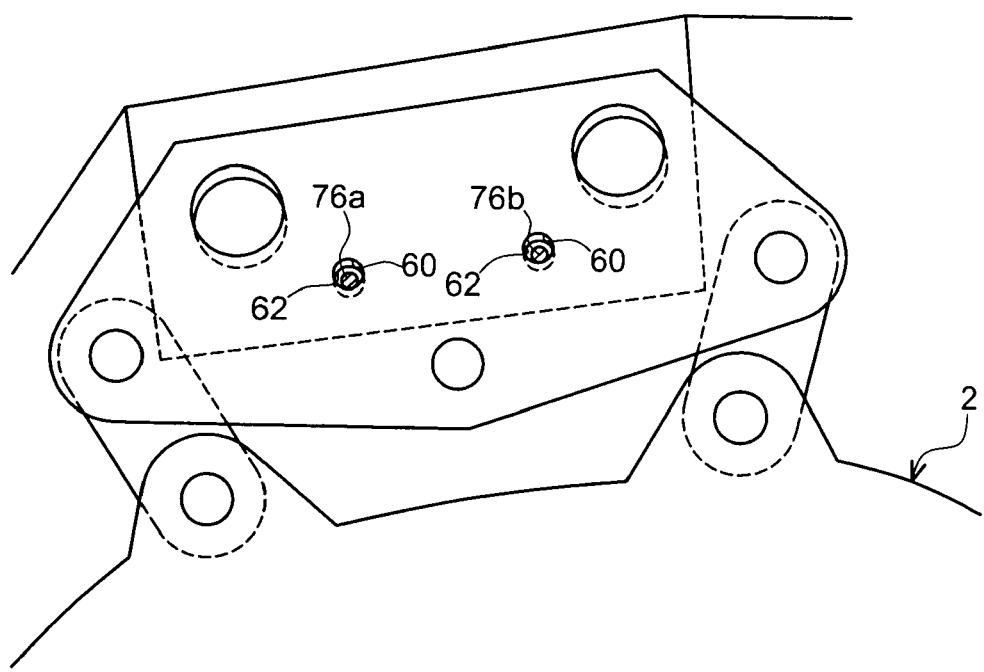
Figure 5D:
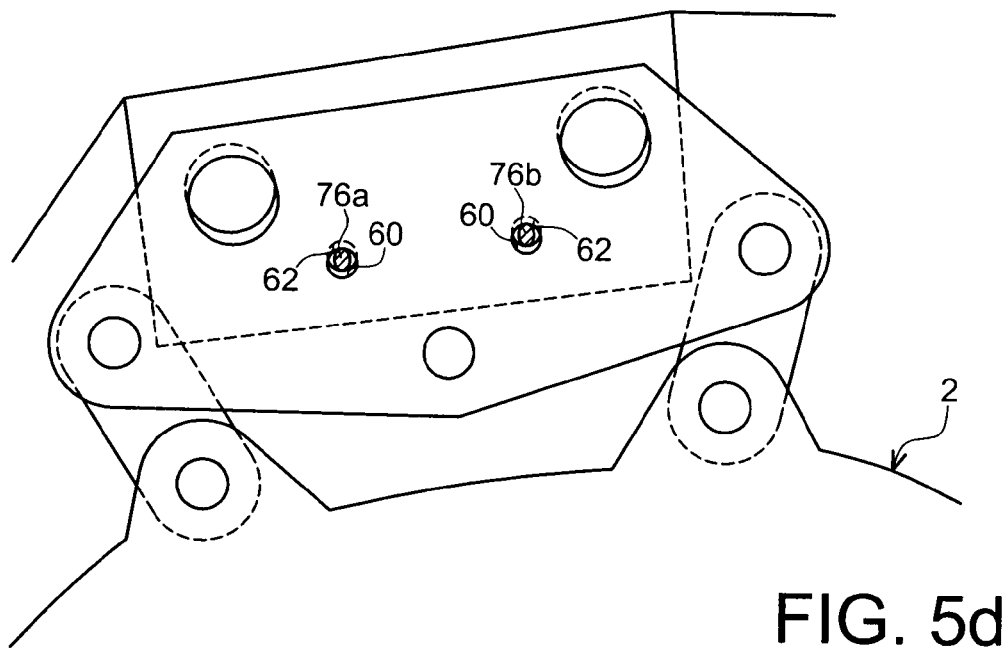

FIG. 5a shows that, prior to conducting this securing step, the engine 2 carries the attachment body 46, in particular via shackles/links 50 pivoted on the fan case. In addition, the engine rests in a so-called vertical or upright position in which the attachment body 46 lies upwardly, whilst the engine mount 4 lies in any position above the engine 2.

Before proceeding with moving the engine 2 using conventional lifting means, the body 46 is fitted with tooling enabling it to be blocked in position relative to the engine, and hence preventing pivoting of this body 46 about its two associated shackles/links 50. In this manner, the subsequent pre-positioning operation is advantageously unhindered by any relative movement between the body 46 and the engine 2.

The pre-positioning operation of the engine 2 relative to the engine mount 4 can then be initiated, its purpose being to place each of the two first primary orifices 56 opposite their associated second primary orifice 58. This pre-positioning of the engine 2 is performed so as to obtain rough alignment between the primary orifices, preferably by lifting the engine 2 to a position slightly above its final position relative to the engine mount 4. Therefore, as can be seen FIG. 5b, the first primary orifices 56 are slightly offset upwardly relative to the second primary orifices 58 made in the rib 36, and similarly the first secondary orifices 60 are slightly offset upwardly with respect to the second secondary orifices 62 made in this same rib.

Next, the pre-positioning operation of the engine 2 is continued by inserting a first support pin 76a through the first group of secondary orifices 60, 62, and by inserting a second support pin 76b through the second group of secondary orifices 60, 62.

Evidently, the two support pins 76a, 76b, also called indexing pins, have a smaller diameter than the diameter of the secondary orifices 60, 62, the ratio between these diameters ensuring operating clearance and possibly ranging from 0.6 to 0.9. This specificity is evidently provided such that insertion of the pins 76a, 76b can be conducted unhampered despite the presence of the vertical offset between the various orifices of substantially identical diameter. After these pins 76a, 76b have been inserted preferably manually and without any friction in the secondary orifices, they then lie under gravity on a lower part of their associated first secondary orifice 60, without contacting their associated second secondary orifice 62 as shown FIG. 5c.

The operation then consists of lowering the engine 2, still using the lifting means, until an upper part of each of the two first secondary orifices 60 comes to bear against its associated support pin 76a, 76b. In this position, shown FIG. 5d, it is also noted that the two support pins 76a, 76b rest on a lower part of their associated second secondary orifice 62. It is this shearing of pins 76a, 76b which alone allows the pre-positioning of the engine to be maintained relative to the engine mount, this pre-positioning then being such that the engine 2 lies slightly below its final position relative to the engine mount 4, as can be clearly seen FIG. 5d. Next, the pre-positioning is completed by contacting the contact surfaces 72 and 74 (referenced FIG. 5e) using adapted tooling e.g. of clamp type.

Therefore, once this operation is completed, it can be understood that the engine does not need to cooperate with lifting means in order to be held in its pre-position relative to engine mount 4.

A new operation can then be started to insert two pins 80 in the first group of orifices and second group of orifices respectively.

Figure 5E:
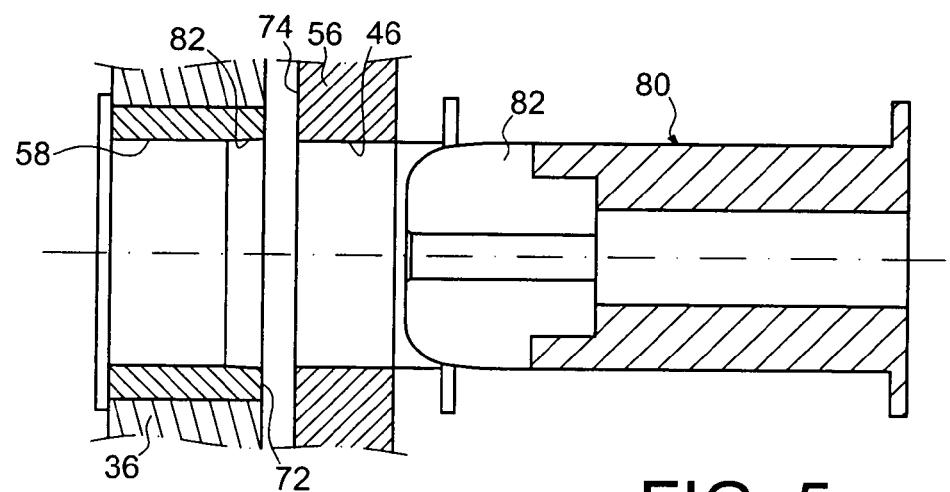

As can be seen FIG. 5e, each pin 80 is fitted with a convex centering head 82 preferably in the shape of an olive and mounted by screwing or press-fitting for example onto a body of the pin 80, this pin being inserted firstly through the first primary orifice 56 of the body 46, then through the second primary orifice 58 that is slightly offset in upward direction. Therefore as the pin 80 is inserted through the second orifice 58, the head 82 progressively cooperates with a bevelled forward part 84 thereof which is designed to facilitate insertion of the pin 80 in this same orifice 58. Evidently, the insertion of the centering head 82 of the pin 80 in orifice 58 will result in gradually aligning the two orifices 56, 58 of same diameter, until perfect alignment is obtained therebetween. By way of indication, it is noted that the diameter of the orifices 56, 58 is identical, except for clearance, to the diameter of the pin inserted therein.

Figure 5F:
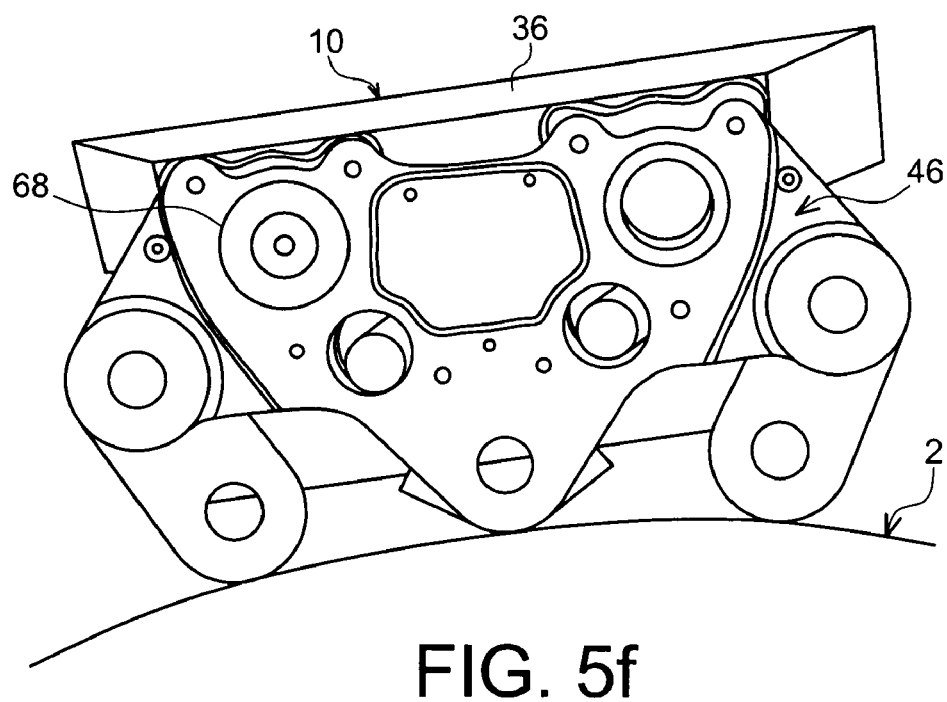

After insertion of the pin 80, it is housed in its two associated orifices 56, 58, and advantageously forms the shear pin 68 as shown FIG. 5f.

Figure 5G:
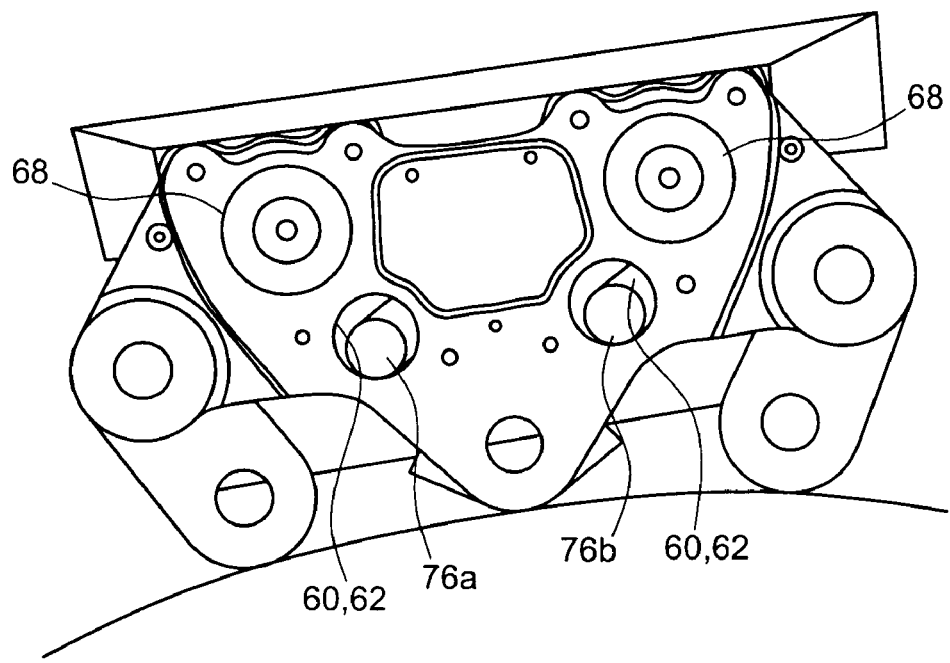

With reference to FIG. 5g, the same pin insertion operation is conducted for the second group of primary orifices, to achieve positioning of the second shear pin 68. Once the two shear pins have been inserted in their respective primary orifices, simultaneously or successively, the engine 2 which has then been lifted up subsequent to alignment of the orifices 56, 58 then lies in its final position relative to the engine mount 4.

In this final position, the secondary orifices 60, 62 are also perfectly aligned in pairs.

Figure 5H:
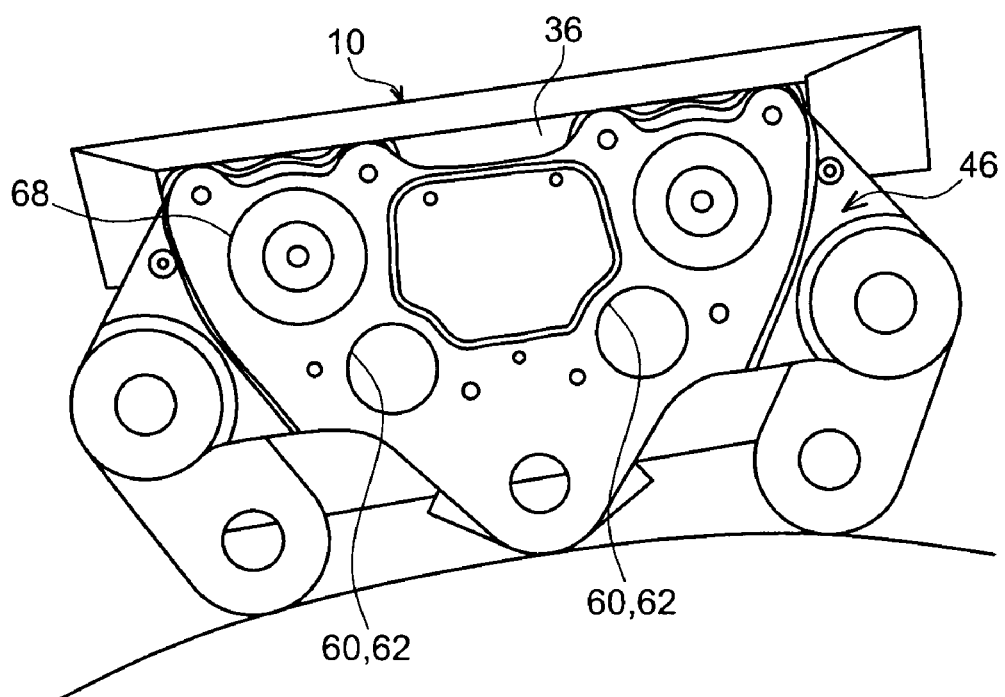

The two support pins 76a, 76b can then be removed leaving the secondary orifices free as shown FIG. 5h, to allow a subsequent operation to place in position two failsafe shear pins 70 in these same secondary orifices 60, 62.

The securing step of the attachment body 46 can then be continued by an operation to place the above-cited tension bolts in position, also oriented along direction X.

In the method of the invention, a similar securing step can be carried out for the aft attachment 8, whilst the mounting of the thrust links can be performed in conventional manner known to those skilled in the art.

Evidently various modifications can be made by persons skilled in the art to the method and aircraft engine assembly 1 just described solely as non-limiting examples. In this respect, it can be indicated in particular that while the engine assembly 1 has been presented in a configuration adapted for its suspending below the aircraft wing, this assembly 1 could also have a different configuration allowing it to be mounted above this same wing.

The invention claimed is:

1. An engine mount for an aircraft engine, the mount comprising:
   a rigid structure forming a box closed at a forward end thereof by a forward closure rib; and
   an engine mounting system fixedly mounted on the rigid structure and including a forward engine attachment including an attachment body fixedly mounted on the rigid structure,
   wherein the attachment body lies against a forward surface of the forward closure rib, and
   wherein the forward engine attachment includes at least one shear pin passing at least in part through the attachment body and the forward closure rib.

2. An engine mount according to claim 1, wherein the attachment body includes an aft contact surface in contact with a forward contact surface of the rigid structure belonging to the forward surface of the forward closure rib.

3. An engine mount according to claim 1, wherein the forward engine attachment further includes a plurality of tension bolts to secure the attachment body onto the forward closure rib.

4. An engine mount according to claim 1, wherein each shear pin is oriented substantially along a longitudinal direction of the engine mount.

5. An engine mount according to claim 1, wherein the forward attachment includes two shear pins each passing at least in part through the attachment body and the forward closure rib, the two pins being spaced apart from each other along a transverse direction of the engine mount.

6. An engine mount according claim 1, wherein the forward closure rib is oriented along a plane defined by transverse and vertical directions of the engine mount.

7. An engine mount according to claim 1, wherein the forward engine attachment is configured to ensure transfer of loads exerted in a transverse direction and vertical direction of the engine mount, and is configured to ensure transfer of moment exerted in a longitudinal direction of the engine mount.

8. An engine mount according to claim 1, wherein the engine mounting system further includes a thrust mount device and an aft engine attachment configured to ensure transfer of loads exerted along transverse and vertical directions of the engine mount.

9. An engine mount according to claim 1, wherein the engine mounting system forms an isostatic system.

10. An aircraft engine assembly comprising:
    an engine mount according to claim 1; and
    an engine fixedly mounted on the engine mount.

11. An engine mount according to claim 1, wherein the rigid structure is an aircraft pylon.

12. A method to mount an aircraft engine on a rigid structure of an engine mount according to claim 1, comprising:
    securing the attachment body of the forward engine attachment previously mounted on an engine case on the forward closure rib of the rigid structure, the attachment body configured to be fixed to the forward closure rib via at least one shear pin passing through a first primary orifice and a second primary orifice respectively made in the attachment body and the forward closure rib, the securing the attachment body onto the forward closure rib including the following successive steps of:

pre-positioning the engine relative to the engine mount to place the first primary orifice opposite the second primary orifice; and inserting a pin fitted with a convex centering head through the two opposite-facing primary orifices, so that the pin fitted with the convex centering head and housed in the two primary orifices forms the shear pin.

13. A mounting method according to claim 12, further comprising repeating the inserting step as many times as a number of intended shear pins between the attachment body and the rigid structure.

14. A mounting method according to claim 12, wherein the pre-positioning step comprises:

bringing the engine close to the engine mount to insert a first support pin through a first secondary orifice and a second secondary orifice made in the attachment body and forward closure rib respectively, and to insert a second support pin through a first secondary orifice and a second secondary orifice also made in the attachment body and forward closure rib respectively, each of the two support pins having a smaller diameter than the diameter of the associated first and second secondary orifices; then lowering the engine until an upper part of each of the two first secondary orifices of the attachment body bears against an associated support pin.

15. A mounting method according to claim 14, wherein after inserting each pin fitted with a convex centering head, the support pins are removed from the secondary orifices.

16. A mounting method according to claim 15, wherein after the removal of the support pins, two failsafe shear pins are inserted through the secondary orifices.

17. A method to mount an aircraft engine on a pylon of an engine mount, comprising mounting a forward engine attachment on an engine case of the engine; and securing an attachment body of the forward engine attachment on a forward closure rib of the pylon via at least one shear pin passing through a first primary orifice and a second primary orifice respectively made in the attachment body and the forward closure rib, the securing the attachment body onto the forward closure rib including the following successive steps of:

pre-positioning the engine relative to the engine mount to place the first primary orifice opposite the second primary orifice; and inserting a pin fitted with a convex centering head through the two opposite-facing primary orifices, so that the pin fitted with the convex centering head and housed in the two primary orifices forms the shear pin.

* * * * *